No. 888,654. PATENTED MAY 26, 1908.
R. S. PRINDLE.
MEANS FOR TRANSMITTING POWER.
APPLICATION FILED MAR. 5, 1902.

7 SHEETS—SHEET 2.

Witnesses
Geo. H. Byrne
Clarence A. Bateman

Inventor
R. S. Prindle

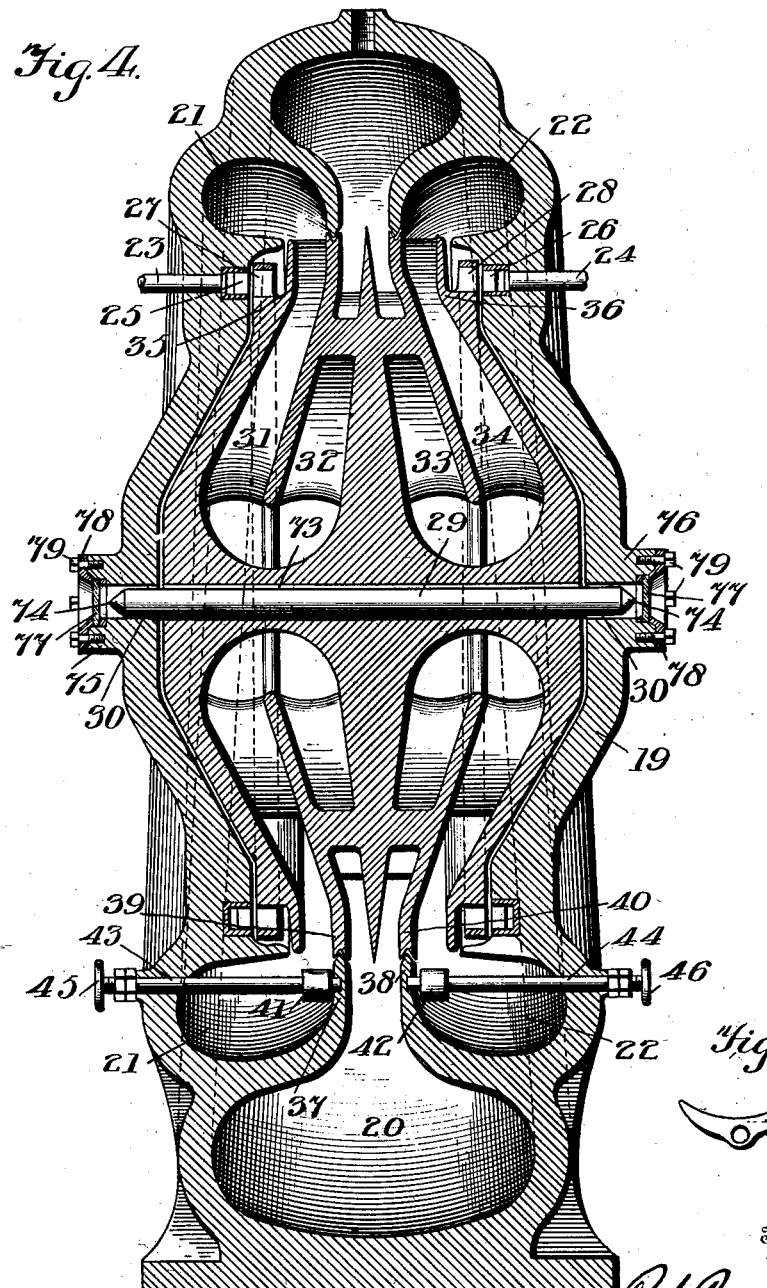

No. 888,654.　　　　　　　　　　PATENTED MAY 26, 1908.
R. S. PRINDLE.
MEANS FOR TRANSMITTING POWER.
APPLICATION FILED MAR. 5, 1902.
7 SHEETS—SHEET 4.
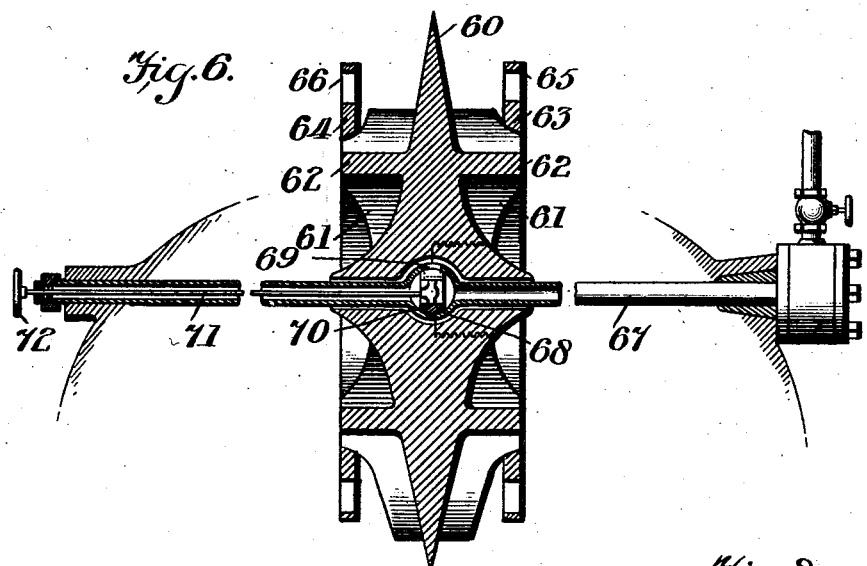
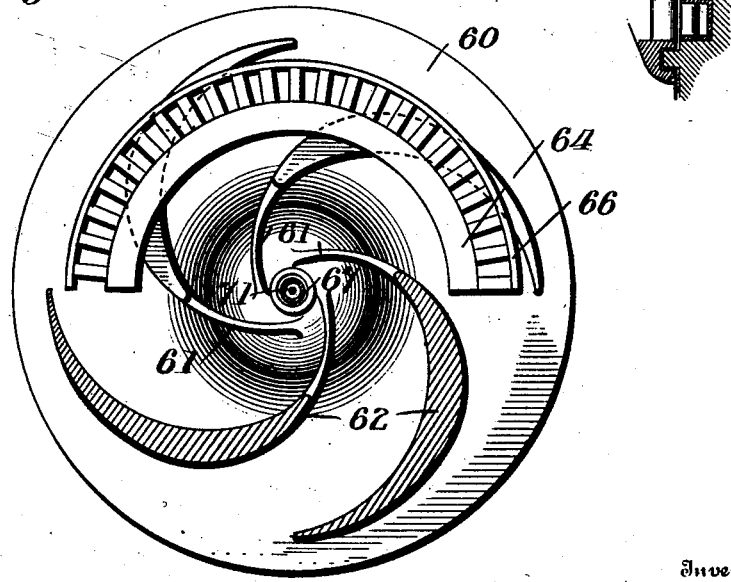
Witnesses　　　　　　　　　　Inventor

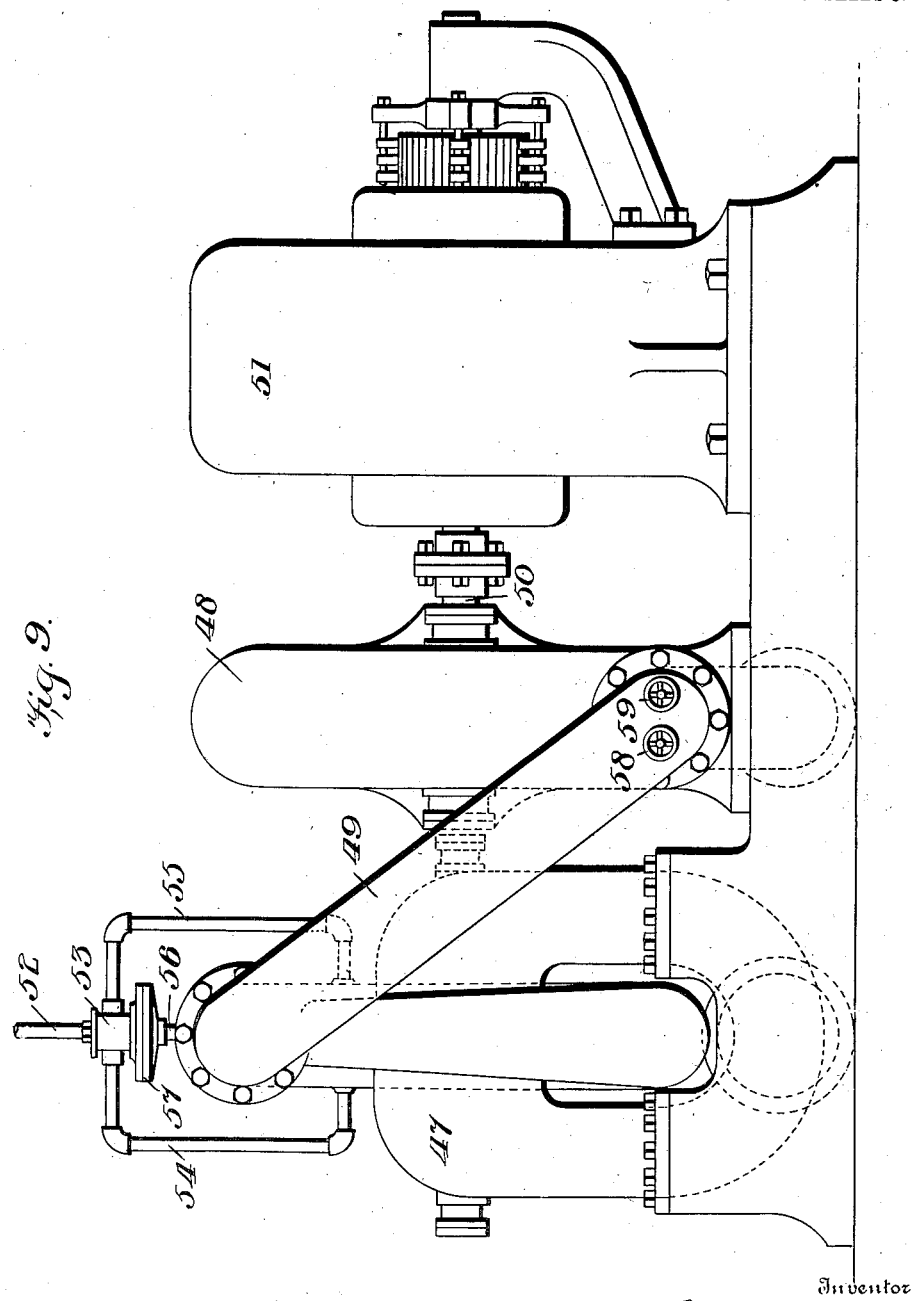

No. 888,654. PATENTED MAY 26, 1908.
R. S. PRINDLE.
MEANS FOR TRANSMITTING POWER.
APPLICATION FILED MAR. 5, 1902.
7 SHEETS—SHEET 6.
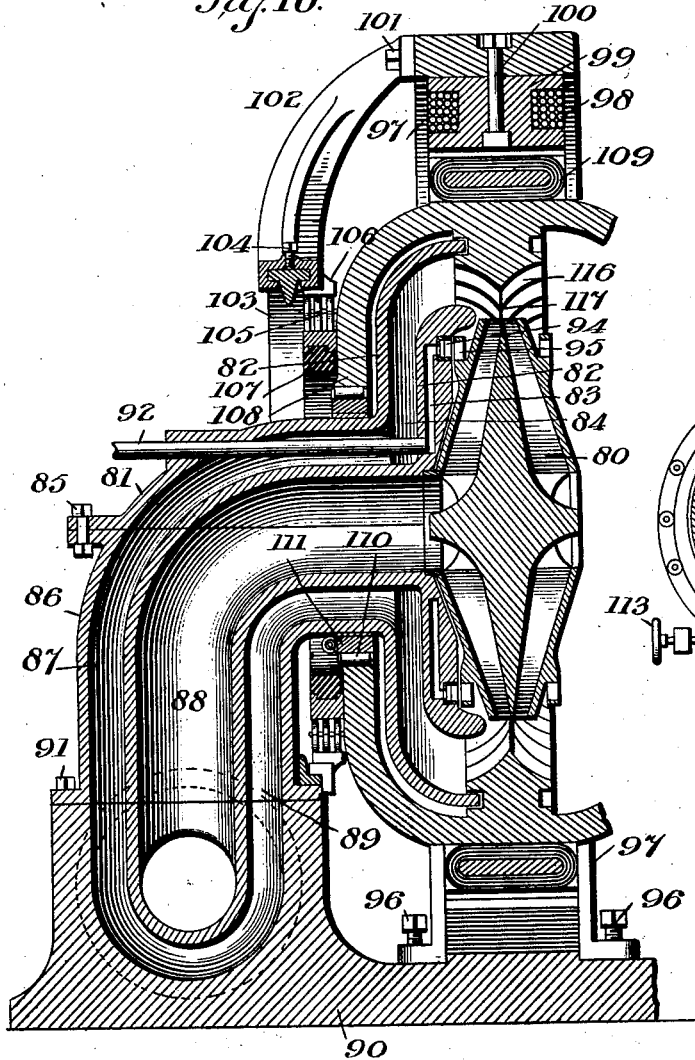
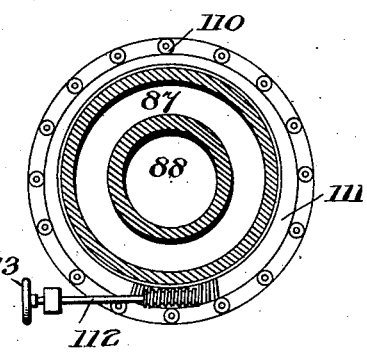
Witnesses
Inventor

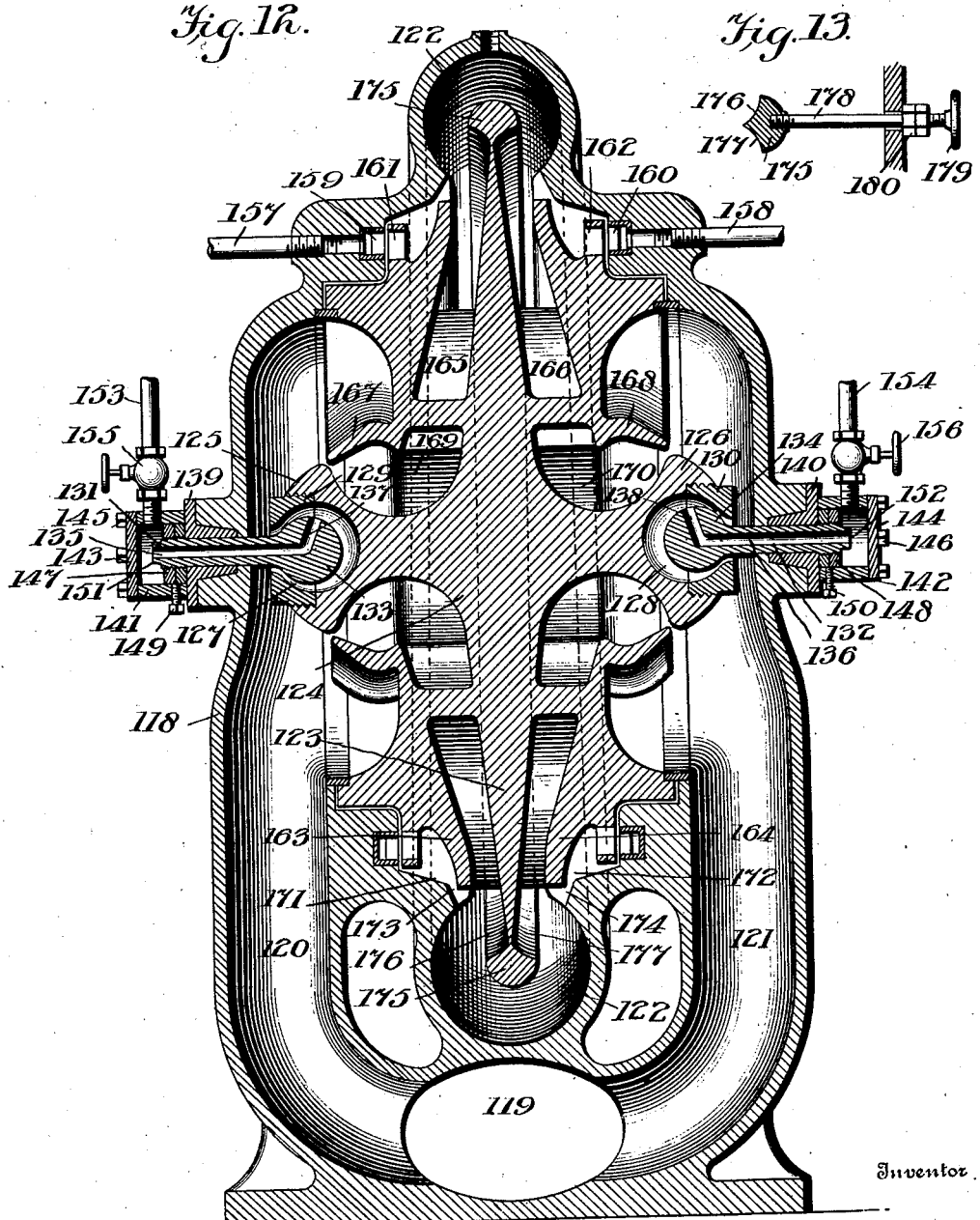

UNITED STATES PATENT OFFICE.

ROSCOE S. PRINDLE, OF NEW YORK, N. Y., ASSIGNOR OF ONE-HALF TO CHARLES H. TOMPKINS AND VINCENT C. TOMPKINS, OF NEW YORK, N. Y.

MEANS FOR TRANSMITTING POWER.

No. 888,654.	Specification of Letters Patent.	Patented May 26, 1908.

Application filed March 5, 1902. Serial No. 96,827.

*To all whom it may concern:*

Be it known that I, ROSCOE S. PRINDLE, a citizen of the United States, residing at New York, in the county of New York and State of New York, have invented certain new and useful Improvements in Means for Transmitting Power; and I do hereby declare the following to be a full, clear, and exact description of the invention, such as will enable others skilled in the art to which it appertains to make and use the same.

My invention relates to improvements in means for transmitting power, and the object of my invention is to secure the most economical use of the motor fluid, preferably steam, which steam may be used at any temperature and pressure but preferably at high pressures, resulting in high velocities. In fact I prefer in most cases to use superheated steam although my invention is not confined to such use. I attain this object by apparatus so arranged as to practically do away with friction and render it possible to run said apparatus at a very high speed, thereby obtaining a great amount of power from a simple, small and comparatively cheap apparatus.

The general theory of my invention is to utilize the energy of a gas, preferably steam, to set in motion a solid, transmitting the energy caused by the movement of said solid to a fluid, usually water, and by the movement of said fluid impart movement to a solid, such as a water wheel or motor, from which the power may be taken off and used.

With these objects in view my invention consists in the improved means hereinafter described and claimed.

Figure 1:
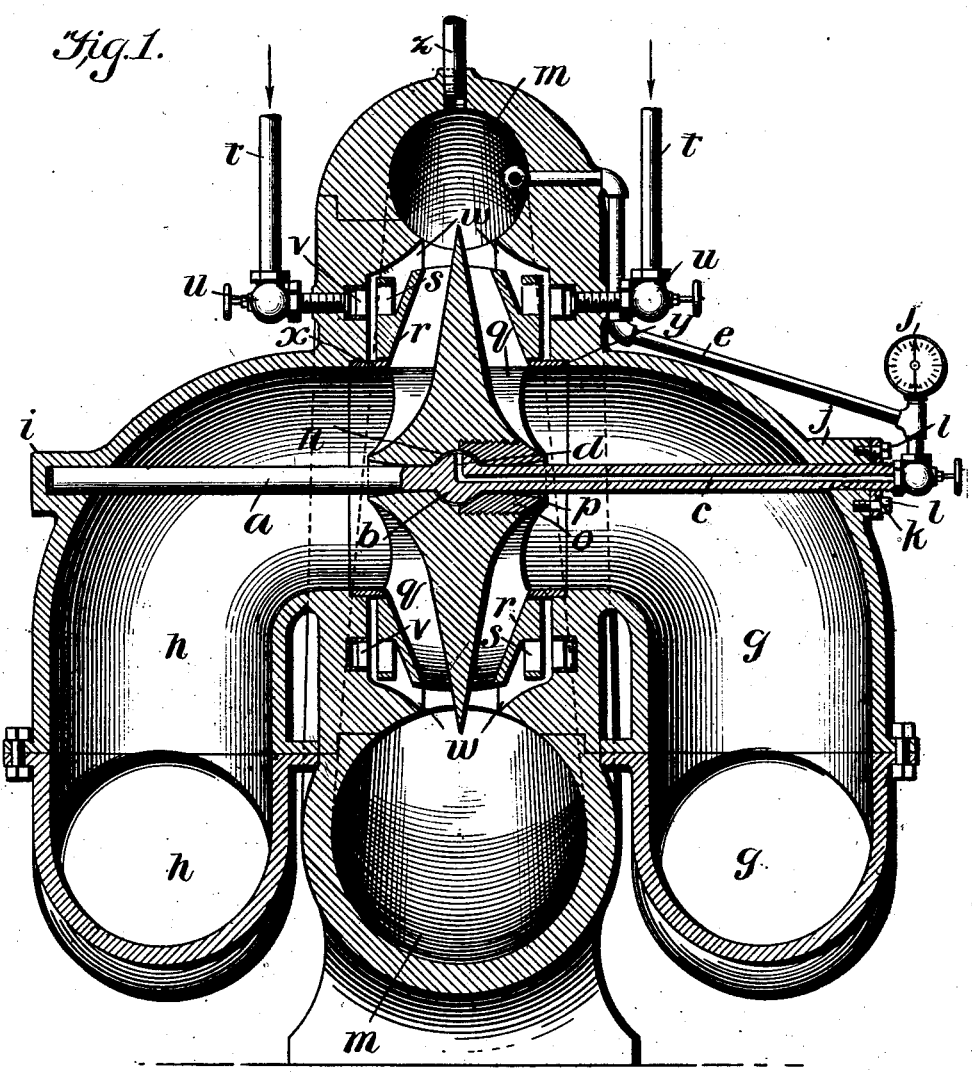
Figure 2:
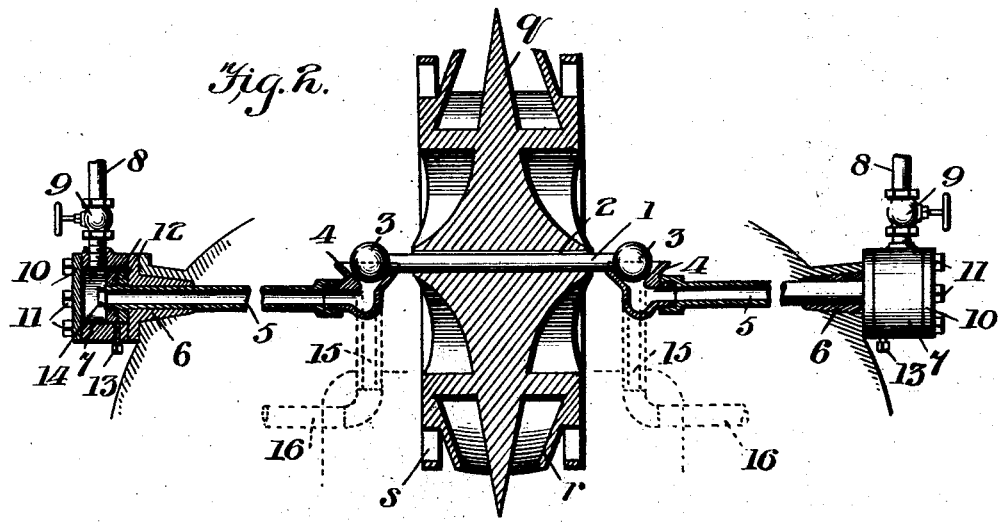
Figure 3:
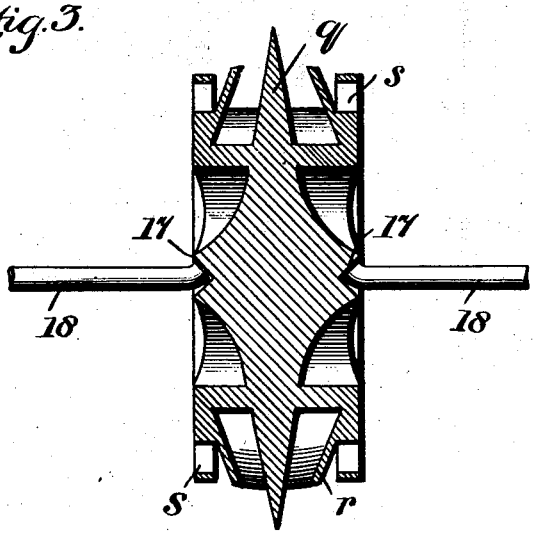

In the accompanying drawings, which show different forms of apparatus adapted to carry out my invention,—Figure 1 is a cross section of a combined steam turbine and centrifugal pump. Fig. 2 is a cross section of a modification thereof, the casing being removed. Fig. 3 is a similar section of still another modification. Fig. 4 is a cross section of still another modification, showing a turbine and combined centrifugal and centripetal pump, all in one structure. Fig. 5 is a side elevation of one of the blades 41. Fig. 6 is a cross section of another modification showing a combined turbine and centrifugal pump with an open type of runner. Fig. 7 is a side elevation, partly in section, of the same. Fig. 8 is a detail view, and Fig. 9 is a side elevation of the construction shown in Fig. 1, together with a Pelton or other water wheel driven by said combined turbine and pump, and a dynamo driven by said water motor. Fig. 10 is a broken cross section of a modification showing a self-condensing steam turbine, a pump, a liquid motor and an electric generator, all in one structure. Fig. 11 is a detail view, partly in section, of one of the bearings therefor. Fig. 12 is a cross section of another modification, showing a combined centripetal - centrifugal pump and steam turbine, and Fig. 13 is a detail view showing the means for supporting and adjusting the pressure ring.

In Fig. 1 is shown a combined steam turbine and centrifugal pump, which acts as a condenser at the same time. Indeed this may be used as a steam condenser instead of the ordinary jet condenser, if desired. All the parts shown in Fig. 1 are stationary except the combined turbine wheel and pump runner and the parts are so arranged that when in operation the combined turbine wheel and pump runner float in the fluid, being sustained by the moving water and steam, thereby practically doing away with friction and rendering it possible to run the same at a very high speed, 50,000 revolutions a minute or more, the turbine wheel and pump runner running out of contact with the casing or other fixed parts of the apparatus, there being no gearing to be directly driven and there being no power delivered directly to a rotating shaft, as is common in all types of reciprocating and rotary engines, pumps and steam or gas turbines.

Another advantage is that this apparatus is perfectly and automatically balanced when in operation, any tendency to oscillate or wabble being automatically corrected by the fluid pressure. In this apparatus the steam may be used either by impact, by re-action, by expansion or by any combination of the three.

In Fig. 1, *a* represents a stationary shaft on which is loosely supported the combined turbine wheel and centrifugal pump runner. At the center of this shaft is a spherical enlargement *b*. One or both halves of the shaft may be made tubular as shown at *c* and this tube in the center is turned upward as shown at *d*. A pipe *e* connects with the discharge chamber of the pump and with the tubular portion *c*. A water gage *f* to show the pressure is preferably mounted on the tube *e*. The casing is made as is usual in making centrifugal pumps except as varied for the admission of the steam to drive the turbine. *g* and *h* represent two pipes connected with the water inlet at one end and delivering to the central part of the centrifugal pump. *i* represents a bearing for one end of the shaft *a*, and at the other end the shaft is mounted in an extension *j*, being secured therein by a nut *k* which is fastened to the extension *j* by bolts *l*. *m* represents the circular discharge chamber of the centrifugal pump which is made in the usual way,—in the form of a volute, smallest at the top,—although of course the apparatus may be so arranged as to discharge at any desired point in the volute. Similarly the pipes *g* and *h* might come from above or from any desired point. The centrifugal pump is of the ordinary closed runner type. It is provided with a central cutaway portion *n* for the reception of the enlarged portion *b* of the shaft *a* and is loosely secured on said enlargement by a nut *o* the outer part of which is flaring as shown at *p*. The pump has the ordinary curved arms *q* and wings *r* substantially parallel thereto. On these wings are mounted impeller blades *s*, one series on either side of the pump. Steam is admitted through the pipes *t* governed by hand valves *u* into recesses into the casing provided with curved deflecting vanes *v*, from whence the steam passes to the impeller blades *s*, thereby causing the revolution of the combined turbine wheel and pump runner.

Between the wings *r* and the casing are discharge passages *w* for the exhaust steam and the centrifugal action of the water passing out between the side wings and the curved impeller arms draws with it the steam and condenses it at the same time, the apparatus thus acting as a most efficient self-condenser. Of course any number of rings of deflector and impeller blades might be used, it being desirable, however, that the same number should be used on each side so that a perfect balance may be maintained, and these impeller rings may be placed in any desired position along the side of the wings so as to take advantage of the principle of expansion.

*x* and *y* represent circular deflecting plates laid into the casing so as to deflect the incoming water into the passage between the impeller blades and wings, and to prevent it from entering the space between the blades *s* and *v* and to assist in maintaining the vacuum already established at the periphery and maintaining it within the case of the centrifugal pump.

In the upper part of the casing is screwed a pipe *z* into which steam delivers, thereby acting to exhaust the air in the casing and prime the pump in the usual way. The pump can also be primed from the suction when the discharge valve is closed.

The operation of this apparatus is as follows: After the pump is primed steam is admitted to the turbine and the combined turbine wheel and pump runner commences to revolve, setting up a centrifugal action, driving the water out into the discharge chamber *m*, and drawing it in through the pipes *g* and *h*, the discharge valve of course being opened slowly until the momentum of the column of water in the suction pipes becomes great enough to keep the vacuum continuously established. As soon as this takes place some of the water from the discharge chamber passes through the pipe *e* and through the hollow shaft and is discharged at the center of the centrifugal pump which is loosely mounted on said shaft. The water then works out slowly sidewise in both directions and with an upward pressure thereby counterbalancing the weight of the combined turbine wheel and pump runner and furnishing a water bearing therefor, so that said pump runner and turbine wheel actually float in the fluid. This renders it possible to use the very highest speeds that can be obtained by the use of steam at a very high pressure or even after said steam has been superheated. Any heat which might otherwise be due to liquid friction is at once conducted away by the circulation of the water in through the pipes and out through the pump. The amount of water delivered by the pump need never exceed the amount required for the condensation of the steam, while the pressure of the outflowing jet may be varied within very wide limits.

In Fig. 1, I have shown a single turbine wheel, that is, with one ring of impeller blades and one ring of diverter blades on each side of the runner. It is obvious that instead of this construction I may use compound or multiple constructions, condensing or non-condensing, thereby enabling me to utilize the principles of impact, reaction, expansion or any combination thereof. These constructions may be upon the same wheel or upon similar wheels, placed side by side, with separate or continuous water passages, or independent sets where two or more liquids are handled, the steam inlets being also arranged to balance each other. I may, for example, use two rings of diverter blades and two rings of impeller blades, inter-running therewith, on each side of the central vane, the impeller blades being secured upon the runner and the diverter blades being secured upon the casing. I prefer, however, to use the same number of impeller and diverter blades on each side of the central vane and to have them symmetrically arranged, for the sake of obtaining a perfect balance.

In Fig. 2 a modification is shown, the manner of supporting the combined turbine and centrifugal pump being varied. A short shaft 1 is fixed by a feather 2 to the runner in the central part of the pump. Of course it may be secured thereto in any desired way; for example, the shaft may be made in two pieces and screwed into the runner. This shaft terminates in balls 3 which may be made integral therewith or fastened thereto or indeed the balls may be turned upon a central portion of the pump runner itself. These balls rest in cups 4 perforated at the bottom and supported on the hollow pipes 5 which pass through supports 6 in the casing. These supports terminate in hollow boxes 7 with which water pipes 8 provided with valves 9 are connected. These boxes have removable covers 10 fastened thereto by bolts 11. The pipes 5 are secured in position in said boxes by lock nuts 12 which in turn are fastened by the bolts 13. The outer end of each pipe 5 is squared as shown at 14 to receive the head of a wrench so that these pipes may be turned into the desired position which is determined by experiment, so that these floating bearings may be adjusted to meet any required condition. Instead of supporting the balls 3 by pipes passing through the sides of the casing, they and the cups 4 may be supported on pipes 15 rising from the standard, water being delivered into said pipes 15 by pipes 16, or they may be supported from any other points radial to the plane of the pump. These methods of support may also be used in combination, if desired.

In Fig. 3 still another method of supporting the pump when at rest is shown. The central part of the pump is provided with a conical depression 17, one on each side. Within each of these depressions a pipe 18 is fitted which at its inner end turns up so as to be parallel with the upper face of said depression. Water is supplied to the pipes 18 from the discharge chamber of the pump as already described.

In Fig. 4 is shown another modification in which a centrifugal and centripetal pump is combined with a steam turbine. In this figure, 19 represents the casing provided with an inlet chamber 20 made in the shape of a volute, and shown in the drawing largest at the bottom, although of course this arrangement may be varied, if desired. 21 and 22 represent circular volute discharge chambers similarly arranged, located nearer the center of the apparatus and on either side of the water inlet, although of course this arrangement may be reversed if desired. 23 and 24 represent inlet pipes for the steam which passing between the fixed blades or vanes 25 and 26 impinges upon the impeller blades or vanes 27 and 28 which are arranged in rings secured to the runner. The runner is mounted on a shaft 29 loosely supported in annular openings 30 in the sides of the casing. This shaft merely sustains the weight of the runner when the apparatus is at rest, and for safety in transportation. When the apparatus is running the complete runner carrying the impeller blades or vanes 27 and 28 floats upon the liquid, as already described.

The runner is shown in cross-section in Fig. 4 and consists of a central portion which is fitted on the shaft 29. Its general shape is that of a circular cone tapering away from the shaft. On the outer edges are mounted the two rings of impeller blades 27 and 28.

Passages 31, 32, 33 and 34 are cored out in the runner, the passages 32 and 33 being curved in one direction so that when the runner is revolved they will force the liquid towards the center, while the passages 31 and 34 are curved in the opposite direction and force the water from the center into the discharge chambers 21 and 22. If desired these passages can be obtained by making the wheel in the several different parts and fastening them together instead of by cutting them out of solid metal.

Near the rings 27 and 28 the runner is extended out as shown at 35 and 36 into close proximity with the casing but still leaving passages therebetween. This is to carry the water discharged by the runner past the impeller blades 27 and 28 so that the steam will not be condensed until it reaches the discharge chambers 21 and 22, into which it is drawn by the outflowing streams of water through the passages 31 and 34 into the discharge chambers 21 and 22.

The casing is provided with curved wings 37 and 38 which separate the inlet chamber 20 from the outlet chambers 21 and 22. These wings have V-shaped ends which run in correspondingly shaped grooves in the wings 39 and 40 of the impeller wheel, but which do not touch them, whereby a water packing is formed between the inlet and discharge chambers.

One of the objects of my invention is to support this combined runner and turbine free from all contact with the casing, and have it simply float upon the liquid when it is in actual operation. This I accomplish by means of wings or vanes arranged in rings in the annular passages 21 and 22. These might be arranged to pass completely around the casing, but as a matter of fact as it is only desirable to have them so arranged as to lift the weight of the runner, that is to say so that the shaft on which the runner is mounted will run free of the casing, it is only necessary to put these blades or vanes in the lower part of the apparatus. These blades or vanes are numbered 41, 42, and are operated by means of shafts 43, 44, passing out through the casing and provided with handles 45, 46, for operating them. Any desired means, such as lock nuts or ratchets and spring-pressed pawls may be used for holding said blades or vanes in any desired adjusted position. One of these blades or vanes 41 is shown in side elevation in Fig. 5.

In Fig. 4 I have also shown means for determining whether or not the shaft 29 is properly centered and supported by the fluid during rotation. The runner is secured upon this shaft by a feather 73 or in any other suitable way. Each end of this shaft is made conical as shown at 74, the apex of each cone being the center of the shaft. The casing 19 is provided with perforated extensions, 75, 76. Glass plates 77, are secured in said extensions by centrally perforated covers 78, secured to the casing by bolts 79. Each of these glass plates has on it an engraved point so located that this point will be in line with the apex of the corresponding cone on the shaft 29 when said shaft is properly centered. This affords a ready means of determining whether the shaft, and therefore the runner, is in proper position when running. If it is not, by the movement of the blades or vanes 41, 42, the proper adjustment may be obtained.

In Figs. 6, 7, and 8 another modification of the invention is shown in which the centrifugal pump instead of being of the closed runner type is of the open runner type with rings supporting the symmetrically arranged rings of impeller blades on the impeller arms. In these figures 60 represents the central vane to which are attached the webs 61 approximately spiral in shape, which webs are enlarged to form arms 62 which act to throw the liquid out into the discharge chamber, and which arms run in close proximity to the casing, but without touching it. On these arms are supported rings 63 and 64, to which the rings 65 and 66 of impeller blades are attached, these rings 63 and 64 being merely large enough to afford support for the rings of the impeller blades. The casing is brought in over the rings of the impeller blades 65 and 66, and if desired the rings 63 and 64 may be slightly cut away to form a groove to receive a corresponding projection of the casing that surrounds the diverting blades, as shown in Fig. 8, although this is not really necessary. Preferably the blades 65 and 66 are made concave so that the steam which strikes the bottom thereof will be forced upward at an angle thereto towards the discharge chamber. Thus the natural tendency of the steam and of the water driven by the pump owing to centrifugal action will be outward towards the discharge chamber, the result being that there is no trouble occasioned by the water working up into the rings of impeller blades and condensing the steam there. In Fig. 6 there is also shown a modification in the means for furnishing a water bearing to the runner so that when in rotation it may practically be supported by fluid. The shaft 67 which supports the runner when at rest is hollow, and at one end is connected by a pipe with the discharge chamber, or other source of water under pressure, as already described. This shaft has a central enlargement 68, and a semi-circular slit 69, cut into the upper part thereof to deliver water upwardly against the runner. A semicircular valve 70 mounted on a handle 71 and controlled by a hand wheel 72 outside the casing is provided, whereby the direction and amount of the incoming current of water is controlled, which current furnishes the water bearing for the runner. In other respects this support is practically the same as shown in Fig. 1.

In Fig. 9 is shown a side elevation of a combined steam turbine and pump which drives a Pelton wheel or other water motor, which motor in turn supplies power for any desired purpose, such for instance as to the shaft of a dynamo to which in Fig. 9 the shaft of the water motor is shown coupled.

In practice it would not do to couple a dynamo shaft directly to the axle of a turbine, for several reasons. In the first place, very high speeds are necessary to obtain the highest efficiency from a steam turbine. 50,000 revolutions a minute is not an excessive number. This is far in excess of any rate of speed at which the shafts of dynamos have up to the present time been driven. Commercial dynamos are never driven more than 5000 revolutions a minute, and the average is considerably less than this. It is evident therefore, that it is impracticable merely from consideration of speed to couple the shaft of a dynamo directly to the shaft of my steam turbine runner. Another reason is that I desire to make the steam turbine small in size and cheap in construction which could not be done if it were coupled directly to the shaft of a dynamo, for which purpose, among others, my improved apparatus has been designed. Moreover, dynamos are commonly driven at much higher speed than other kinds of machinery so that in the latter case the objection would be still greater. Another reason is that if the dynamo were coupled directly to the shaft of the runner a torsional strain would be set up in said shaft which is one of the things I desire to avoid, since this strain would result in a tendency to destroy the balance of the turbine, deflecting the shaft and tending to bind the gears, and making very carefully arranged and elaborate bearings necessary. Moreover, if such a torsional strain existed it would be exceedingly difficult, if not impossible, to cause the combined turbine wheel and runner to float upon the liquid, a thing which is one of the especial objects of my invention, and which results in special and very great advantages. In my construction the very lightest kind of turbine compared with the amount of power obtained therefrom can be used on account of its exceedingly high speed and because it practically does away with friction of both air, liquid and metallic contact. Of course there is a slight amount of skin friction of the liquid in the pump, but this is so small compared with the amount of friction in ordinary turbines that it is practically negligible.

In my construction nearly all the strains are practically applied at the point of impact of the steam upon the impeller blades and usually near the periphery, the result being that these strains are comparatively slight, are equally distributed without shock, and therefore do not interfere with the working of my apparatus. For these reasons I prefer to use a small steam turbine as described, to run that at a very high speed, and by means of the water discharged to run a Pelton wheel or some other suitable construction of water motor, at a much lower speed, from which motor the power for driving the dynamo or other machinery is directly obtained. By means hereinafter described the speed of the turbine itself and of the water motor may be regulated as desired.

In Fig. 9, 47 represents a steam turbine of the construction already described, and shown for example in Fig. 1. 48 represents a Pelton wheel or other desired form of water motor. The steam turbine and wheel are connected by a pipe or water way 49 which connects with the discharge chamber of the steam turbine, and delivers the impelling fluid to the motor 48. To the shaft 50 of the water motor is coupled the shaft of a dynamo 51. If desired, however, this shaft 50 could be used to run any form of machinery in any of the usual ways.

The means for governing the rate of speed for the steam turbine will now be described.

In Fig. 9, 52 represents the steam inlet pipe which delivers into a chamber 53 from which branch pipes 54 and 55 conduct the steam to the steam turbine. A pipe 56 is connected with the discharge chamber of the centrifugal pump and at its other end is connected with the casing 57 in which is a diaphragm or piston. This is connected to a valve in the chamber 53 and is so arranged that the varying pressure in the discharge chamber of the pump actuates the diaphragm or piston and thereby the valve, admitting or cutting off the steam to the pipes 54 and 55 as desired. The variations may be adjusted as desired by a hand screw and spring as common in pressure regulators. Thus it will be seen that the pressure in the discharge chamber of the combined turbine and pump automatically regulates the speed.

Of course the water motor 48 is liable to run at different speeds according as the load is increased or diminished. This is regulated in the usual way by means of the valves 58 and 59 which control the fluid jets which drive the water motor, which is preferably made with a double set of buckets in the usual way. The speed of the water wheel can be regulated by any usual form of governor such as a centrifugal. If the speed is increased above a certain limit the amount of water passing through the jets is automatically diminished by this governor. This results in a greater pressure in the pipe or water-way 49 which in turn increases the pressure in the discharge chamber of the combined steam turbine and pump, which, by the means already described, acts to cut off part of the supply of steam to said turbine, thereby reducing the speed. This regulating action is practically instantaneous and this establishes a positive and extremely close speed regulation, dependent simply upon the speed to which the water motor 48 is set.

In the various modifications, the casing is shown as stationary and the runner rotatable therein. It is obvious that this arrangement could be reversed, and that the casing could be made rotatable and the inner part stationary.

In Fig. 10 is shown a steam turbine, a centrifugal pump, a water motor and an electric generator, all in one unitary structure, Fig. 11 showing details thereof. 80 represents a centrifugal pump runner, of the closed type, similar to that shown in Fig. 1, provided with curved impeller arms, side wings and rings of impeller blades mounted thereon. The casing of all these structures may be divided into either vertical or horizontal sections. 81 represents the upper part of the stationary casing, which is cored out, leaving plates 82, 83, with a passage 84 therebetween. This fits upon another stationary part 86, being united thereto by bolts 85. The part 86 is cored out, leaving passages 87, 88 and 89, the passage 88 being the water inlet, and the passages 84, 87 and 89 being the water outlets. The part 86 rests upon the stationary base 90, being united therewith by bolts 91, which base is also cored out to form passages which are continuations of the passages 87, 88 and 89.

Steam is admitted through a pipe 92, or through a passage cored in the casing 81, into an annular space 93, cored in the casing 81, from whence it passes from between the diverter blades 94 and against the impeller blades 95, causing the pump runner to revolve, as already described. These blades may be compounded or used in multiple, if desired, thereby utilizing the principles of impact, reaction, expansion, or any combination thereof; and the water motor hereinafter described, may also be compounded or used in multiple, if desired.

Secured adjustably to the base 90, by means of bolts 96, is a metal ring 97, which supports the field coils of an electric generator. In this case a generator of direct current is shown, but I may, of course, use a generator of alternating currents, if desired. The coils 98 are supported on cores 99, united to the ring 97 by bolts 100.

Secured by bolts 101 to the ring 97 are one or more bracket arms 102 in which is supported a sliding brush supporting ring 103 which may be fastened in said brackets in any desired position by screws 104. Brushes 105 are carried in brush holders 106 supported by the ring 103 and may be adjusted in a circle around the commutator as desired.

The commutator 107 is of the usual type and mounted on the shell or casing 108 which supports the armature coils 109, made in the usual way. These coils of course revolve in close proximity to the field coils but do not touch them. The shell or casing 108 is supported on anti-friction rollers 110 preferably mounted in spacing rings in the usual manner to form a cage. These anti-friction rollers are supported on a ring 111 preferably made of hardened steel, annular in its general form but thickest at the top, as shown in Fig. 11, this ring 111 being mounted on the stationary casing 81, 86. The ring 111 is in fact an eccentric bearing ring and by means of a screw bolt 112 a rack and pinion and hand wheel 113, this ring may be adjusted around the periphery of the casing 81, 86, thereby adjusting the armature structure in relation to the casing. The object of this adjustment is to vary the reaction pressure from the buckets 116 upon the pump runner 80 so that when running this pump runner will be automatically balanced, the line 117, after adjustment, being eccentric to the central vane of the pump runner 80. After this adjustment is made the frame supporting the field coils is adjusted so that these coils will be concentric with the armature coils in the usual manner by means of the adjusting screws 96, for example, commonly used in alining engine type generators.

The armature structure is driven by means of buckets secured on the interior thereof, against which the liquid discharged by the pump runner directly impinges. On the interior of the movable casing 108 is a ring 114 cut away on each side as shown at 115 for the reception of the part 82 of the stationary casing. On the inside of this ring 114 are mounted buckets arranged in a double series so as to split up the current of water thrown against the same after its energy has been utilized and to divert it on either side into the discharge passages. These buckets 116 are concaved and also curved reversely to each other as shown in Fig. 10, coming to a line 117 in the center, which line is outside of the central vane of the centrifugal pump and in the same plane.

The admission of the water to the water wheel may be controlled in any desired way, for example, by means similar to that shown in Fig. 9, or any of the common ways of controlling volume and angle of impact of the stream of water. Moreover, I do not restrict myself in any way to the exact details of construction; the pump runner for example, may be of the open type, instead of the closed type; it may be simple, compound or multiplex. The means for driving the runner by means of steam may also be simple, compound or multiplex. The particular shape and arrangement of the buckets against which the water is thrown by the centrifugal pump may also be varied. Instead of a direct current generator, an alternating current generator may be used, and in fact all the details may be varied greatly, the central idea of this form of the invention being the making of a steam turbine, a pump, and motor driven by said pump, and an electric generator, all in one unitary structure. Moreover, this apparatus can be used directly as an engine, all that is necessary to do being to take off the field coils, commutators, etc., making the casing 108 a pulley instead of having it carry the armature coils. Power can also be taken from a shaft torsionally by a slight modification.

In Fig. 10 I have shown a very small turbine wheel and pump runner combined which I desire to run at very high speeds. It is not feasible or desirable that the casing carrying the armature coils should be run at the same high speed, and by a proper proportioning of the parts this will not be the case.

It will be understood that the speed of the turbine wheel and pump runner may be anywhere from ten to one hundred times as fast as the speed at which the armature is driven, thus illustrating one of the important points of this invention, the flexibility of the transmitting medium, rendering it possible to use very small amounts of water moved at a very high speed and pressure to obtain large amounts of power.

As already described in connection with Fig. 9, the speed to which the armature is set in the beginning may be used to govern the speed of the whole apparatus.

In Fig. 12 is shown a cross section of a combined centrifugal and centripetal pump and steam turbine. In this figure 118 represents the casing provided with a water inlet 119 which is divided into two branches 120 and 121 which deliver to opposite sides of the pump runner. 122 represents the discharge passage or chamber, preferably in the form of a volute largest at the bottom. I have shown the water inlet pipes as coming from below and the discharge passage at the bottom. It is obvious, however, that these passages may be located in any desired position. The upper part of the volute is provided with a passage, into which is fitted a steam ejector pipe used for priming the pump in the usual way as has already been described in connection with the other modifications. The pump runner itself is provided with a central vane 123 made in the form of a circular cone. This is mounted upon a central part 124, which part is provided with extensions 125 and 126 in which the supporting shafts are mounted. These extensions are cutaway, as shown at 127 and 128 for the reception of the hollow shafts which are confined therein by nuts 129 and 130. The supporting shafts 131 and 132 are hollow and provided with enlargements 133 and 134 at their inner ends. The passages 135 and 136 in said shafts are turned upward and inward at their inner ends as shown at 137 and 138 for the purpose of discharging streams of water upwardly and inwardly against the pump runner to sustain the weight and overcome any lateral thrust thereof. These shafts pass through bearings 139 and 140 located in extensions in the casing and into boxes 141 and 142 which are provided with removable heads 143 and 144 secured to said boxes by bolts 145 and 146. Lock nuts 147 and 148 engage these shafts and bolts 149 and 150 secure these lock nuts in position. The outer ends of the shafts are squared as shown at 151 and 152 for the purpose of receiving the head of a wrench, whereby said shafts may be adjusted in order to perfectly balance the pump runner. 153 and 154 represent pipes connected with the discharge passage 122 or with any source of water under pressure, for the purpose of providing water bearings for the pump runner. 155 and 156 are valves located in these pipes, for controlling the pressure and volume of the water therein. 157 and 158 represent inlet pipes for the steam which passes between diverter blades 159 and 160 and thence onto the impeller blades 161 and 162 which are mounted on the pump runner. I have shown one ring of impeller blades and one ring of diverter blades on each side of the central vane, but it is obvious that more may be used, the diverter blades being secured upon the casing and the impeller blades upon the pump runner, whereby I am enabled to utilize the principles of impact, reaction and expansion. Indeed, the whole apparatus may be used either simple, compound or multi-plex as desired.

The pump runner itself is provided with wings 163 and 164, approximately parallel to the central vane 122. Between these wings and the central vane are curved impeller vanes 165 and 166, so arranged as to drive the liquid out into the discharge passage 122. Another set of curved arms 167 and 168 are mounted on the outer sides of the runner. These arms are curved in the opposite direction from the arms 165 and 166 and serve to draw in the liquid centripetally and deliver it into the pump runner near the center, from whence it is discharged centrifugally. These arms, of course, do not extend up to the central portion of the runner, as it is necessary to leave a passage there for the influx of the water. Moreover, the runner itself is cut away from the center, as shown at 169 and 170 to afford a free passage for the water or other liquid. By this construction, I am enabled to run the apparatus at a very high speed without using a separate pump to feed the centrifugal part of the runner, as is common in apparatus of this type, the vacuum being established and maintained at all times.

Between the wings 163 and 164 and the casing are passages 171 and 172 which connect with the discharge passage 122 by narrower passages 173 and 174, the result being that the liquid thrown out by the centrifugal action of the pump runner draws with it the steam after it has passed through the impeller blades into the discharge passage 122 where said steam is condensed, the apparatus thus acting as a most efficient self-condenser. Moreover, any air that there may be in the apparatus or that is brought in along with the steam is also drawn out and discharged in the same way. This form of the apparatus like the other forms is self-balancing owing to the reason that it is built symmetrically and that the moving columns of liquid and gas impinge upon its opposite sides with equal pressure, thereby insuring a perfect balance. To aid in this action, especially if on account of the defects of the material the plane of gravity should not exactly coincide with the plane of rotation or for other reasons, the central vane 123 is made large enough so as to extend some distance into the discharge passage 122. Any tendency to wabble or oscillate will be automatically corrected by reasons of the variations in liquid pressure which would be caused by the oscillation of this vane. To still further aid in and insure this automatic balancing action, in reference to the weight or running thrust of the runner itself, a ring 175 is mounted on the outer rim of the vane 123. This ring is pivoted with two oppositely arranged curved faces 176 and 177, whereby by means of the central vane and the ring attached thereto, the liquid thrown out by centrifugal action into the discharge passage 122 is divided temporarily into two moving columns or streams. Any tendency of the runner to vary from its proper position of rotation, by settling for example, will result in diminishing the area of the water passage, and will immediately diminish the pressure at that point and increase the pressure at the opposite side of the runner, whereby this tendency will be automatically corrected. This results from the fact that the stream of water is divided into four different moving streams or columns, two on each side of the central vane, through the different inlets and outlets common to each set. This ring 175 may, however, be separated from said central vane, although located in proximity thereto and in Fig. 13 I have shown means for supporting and adjusting it. 178 represents a rod passing through the casing and provided with a hand wheel 179. This rod is secured in position by lock nuts 180. As many of these rods as desired may be used, but I prefer to use at least three, preferably spaced at equal distances apart, two below the center of the casing and one above it. It may also, if desired, be supported eccentrically upon lugs arranged in the volute passage 122. This ring 175 may be adjusted so that it will be eccentric to the central vane 123, preferably nearest to said vane at the bottom, the result being that the pressure of the discharged liquid, being greatest at the bottom, reacts against the runner, thereby overcoming its weight and the thrust due to its rotation. It can be determined whether the runner is running in its proper position by the means described in connection with the runner shown in Fig. 4 or in any other convenient way, for example, by having ports fitted with glass covers cut in the casing at suitable points.

While I have thus described my invention, I wish it to be distinctly understood that I do not limit myself in the slightest degree to the exact details shown and described. The motive fluid for instance may be gas, air, water, or any combination thereof, expansive or explosive and the apparatus may be driven by impact, by re-action, by expansion, or by any combination thereof. The apparatus may also be used as a condensing or non-condensing apparatus, although I prefer to use it as a self-condenser. In short, the gist of my invention is the production of a combined runner and impeller in a single structure, which structure is capable of running freely without contact with the casing and without any support except fluid support, noiselessly and without vibrations or wear and with practically no friction. Moreover, in this way I am enabled to get the highest possible speeds and efficiencies, with a minimum of cost, weight and space taken up by the apparatus.

Having thus described my invention, what I claim as new and desire to secure by Letters Patent is:—

1. In means for transmitting power, the combination of a casing, a rotary part therein, said part being supported entirely by fluid and out of contact with any solid part during rotation, and means for causing the rotation of said part, substantially as described.

2. In means for transmitting power, the combination of a casing, a rotary part therein, means for sustaining said rotary part during rotation, by reacting jets or columns of fluid, and means for delivering a motor fluid upon said rotary part, thereby causing it to revolve by impact, reaction, expansion, or any combination thereof, substantially as described.

3. In means for transmitting power, the combination of a casing, a rotary part therein, means for supporting said rotary part, during rotation, by reacting jets or columns of fluid, and means for balancing said rotary part by fluid pressure, substantially as described.

4. In means for transmitting power, the combination of a casing, a rotary part therein, supported entirely by fluid during rotation and adapted to rotate in a vertical plane, and means for delivering steam against said rotary part thereby causing its rotation, the parts being so arranged that the steam is condensed immediately after passing through said rotary part, substantially as described.

5. In means for transmitting power, the combination of a casing, a rotary turbine wheel therein, said wheel also acting as a pump and being supported entirely by fluid during rotation and provided with vanes, and means for delivering steam against said vanes, said steam being condensed by the fluid discharged by said turbine wheel, substantially as described.

6. In means for transmitting power, the combination of a casing, a rotary turbine wheel therein provided with vanes and with curved passages whereby said wheel acts also as a pump, said wheel being supported entirely by fluid during rotation, means for delivering steam to the vanes of said wheel, and means for automatically balancing said wheel by fluid pressure, substantially as described.

7. In means for transmitting power, the combination of a casing, a rotary turbine wheel provided with vanes and curved passages, whereby said wheel acts also as a pump, and said wheel being fluid-supported during rotation, said casing being volute-shaped, a pipe into which said casing delivers, a second casing connected to said pipe, and a rotary wheel in said second-named casing acted upon by the fluid discharged through said pipe, whereby power is transmitted from said turbine wheel to said second-named wheel without the use of gearing, substantially as described.

8. In means for transmitting power, the combination of a volute-shaped casing having side inlets, a turbine wheel therein provided with vanes and curved passages, whereby said wheel acts also as a pump, said wheel being fluid-supported while rotating, means for delivering steam upon the vanes of said wheel, a pipe into which said casing delivers, a second casing connected to said pipe, a water wheel therein, and means for stopping or reversing the motion of said water wheel, substantially as described.

9. In means for transmitting power, the combination of a volute-shaped casing provided with central inlets for water, a turbine wheel in said casing provided with vanes and with curved passages, whereby said wheel acts also as a pump, means for delivering steam upon the vanes of said wheel, said wheel being fluid-supported when rotating, the parts being so arranged that the steam after passing through the vanes of the turbine wheel is drawn along and condensed by the water thrown out by said wheel, substantially as described.

10. In means for transmitting power, the combination of a casing volute-shaped and provided with central inlets, a turbine wheel in said casing provided with vanes and with curved passages, whereby said wheel acts as a pump, said wheel being fluid-supported while rotating, means for delivering steam upon the vanes of said wheel, the parts being so arranged that the steam is entrained along and condensed by the liquid forced outwardly by said wheel which also forms a partial vacuum in the volute of said casing, substantially as described.

In testimony whereof, I affix my signature, in presence of two witnesses.

ROSCOE S. PRINDLE.

Witnesses:
CLARENCE A. BATEMAN,
GUSTAVE R. THOMPSON.